United States Patent [19]
Kim

[11] Patent Number: 5,909,361
[45] Date of Patent: Jun. 1, 1999

[54] OUTPUT VOLTAGE STABILIZING CIRCUIT OF A POWER FACTOR CORRECTION CIRCUIT AT AN INITIAL POWER-ON STAGE

[75] Inventor: Sang Yeal Kim, Kyoungsangnam-Do, Rep. of Korea

[73] Assignee: LG Electronics Inc., Seoul, Rep. of Korea

[21] Appl. No.: 08/922,774

[22] Filed: Sep. 3, 1997

[30] Foreign Application Priority Data

Sep. 4, 1996 [KR] Rep. of Korea ............... 1996-38183

[51] Int. Cl.[6] ............................................. H02M 3/335
[52] U.S. Cl. ........................... 363/21; 363/49; 323/222
[58] Field of Search ....................... 363/21, 49; 323/222, 323/207, 217

[56] References Cited

U.S. PATENT DOCUMENTS

| | | | |
|---|---|---|---|
| 4,412,167 | 10/1983 | Green et al. | 318/729 |
| 4,890,210 | 12/1989 | Myers | 363/21 |
| 5,363,020 | 11/1994 | Chen et al. | 315/209 R |
| 5,420,780 | 5/1995 | Bernstein et al. | 363/89 |
| 5,675,485 | 10/1997 | Seong | 363/97 |

*Primary Examiner*—Shawn Riley
*Attorney, Agent, or Firm*—Oppenheimer Wolff & Donnelly LLP

[57] ABSTRACT

An output voltage stabilizing circuit of a power factor correction circuit, which initially stabilizes an output voltage of a power factor correction circuit by controlling an on/off timing of a reference oscillating waveform which varies in response to an error voltage in accordance with a charge/discharge voltage outputted from a soft start circuit section. The output voltage stabilizing circuit includes a flyback transformer (FBT) connected to a secondary winding of an output transformer for applying a high voltage and outputting a sync signal, a first control driving section for outputting a switching control signal of the FBT, a soft start circuit for charging or discharging according to a first output of the SMPS transformer, a switching section for controlling the operation of charging or discharging of the soft start circuit in response to the sync signal of the FBT, an error amplifier for amplifying the output voltage of the power factor correction circuit section according to the switching operation of the switching section, comparing section for comparing an output voltage of the error amplifier with the initial output voltage of the power factor correction circuit section and outputting a voltage as a result of comparison, and a second control driving section for controlling a duty ratio to stabilize the initial output voltage of the power factor correction circuit section according to the output voltage of the comparing section.

8 Claims, 3 Drawing Sheets

OFF-TIME POINT
DURING INITIAL
POWER ON STATE

OFF-TIME POINT
WHEN SYNC SIGNAL
IS INPUTTED

FIG. 5B  SYNC SIGNAL

OUTPUT VOLTAGE STABILIZING CIRCUIT OF A POWER FACTOR CORRECTION CIRCUIT AT AN INITIAL POWER-ON STAGE

BACKGROUND OF THE INVENTION

1. Field of the Invention

The present invention relates to an output voltage stabilizing circuit of a power factor correction circuit, and more particularly to an output voltage stabilizing circuit of a power factor correction circuit which, at an initial power-on stage, stabilizes an output voltage of the power factor correction circuit by controlling an on/off timing of a reference oscillating waveform which varies in response to an error voltage in accordance with a charge/discharge voltage outputted from a soft start circuit section.

2. Description of the Prior Art

Generally, industrial or household electric appliances use a direct current (DC) power supply as its operating power supply. The DC power supply is generally produced by a circuit rectifying a commercial alternating current (AC) power supply, such as a capacitor-input type rectifying circuit which has a simple circuit construction. However, the capacitor-input type rectifying circuit has a low power factor because the input current has a pulse type of flowing only over the peak part of the input AC voltage. For this reason, electric appliances generally employ a power factor correction circuit.

FIG. 1 shows a power supply circuit of an electric appliance employing a conventional power factor correction circuit.

Referring to FIG. 1, the power supply circuit of an electric appliance employing a conventional power factor correction circuit including a rectifying section 1 for rectifying a full wave of an input AC power supply; a power factor control section 2 for controlling a power factor or the power supply voltage which has been rectified by the rectifying section 1; a switching mode power supply (SMFS) circuit section 3 for switching a power supply voltage having a power factor corrected by the power factor control section 2 and supplying the switched power supply voltage to a load terminal of the electric appliance; and a digital pulse modulation (DPM) control circuit section 4 for controlling operation of the power supply voltage of the SMPS circuit section 3 in response to a DPM power conservation mode.

The power factor control section 2 is connected to an output terminal of the rectifying section 1 by a coil L1. A diode D1 is connected between one end of the coil L1 and the input terminal of the SMPS circuit section 3. A field effect transistor (FET) Q1 is connected between the coil L1 and the diode D1. A power factor correction control circuit section 2a is connected to a gate terminal of the FET Q1, and a capacitor C1 is connected between one end of the diode D1 and one end of the FET Q1.

The power supply circuit comprising the conventional power factor correction circuit is operated as follows.

If an AC power supply is inputted to the rectifying section 1, the rectifying section 1 full-wave-rectifies the AC current power supply, and inputs the rectified power supply into the SMPS circuit section 3 via the coil L1, diode D1 and the capacitor C1. Then, the SMPS circuit section 3 voltage-converts the inputted power supply voltage to supply the converted power supply voltage to the load terminal. The power factor of the power supply voltage is controlled by the power factor correction control circuit section 2a. For instance, if the power supply voltage inputted to the SMPS circuit section 3 is logic high, the power factor correction control circuit section 2a turns on the FET Q1, thereby lowering the power supply voltage. If the power supply voltage becomes logic low to a certain level by operation of the FET Q1, the power factor correction control circuit section 2a turns off the FET Q1.

The power factor of the power supply voltage inputted to the SMPS circuit section 3 can be corrected by undergoing the above process. In a DPM normal mode described above, the DPM control circuit section 4 outputs a logic high signal to the SMPS circuit section 3, and the SMPS circuit section 3 is operated in a DPM normal mode, thereby supplying a full electric power to the load terminal. In a DPM-off mode, the DPM control circuit section 4 inputs a logic low signal to the SMPS circuit section 3 to operate in a conservation mode. The SMPS circuit section 3 then does not supply the power supply voltage to the load terminal, thereby minimizing consumption or the electric power.

However, the power supply circuit of an electric appliance comprising the conventional power factor correction circuit described above has a drawback that the SMPS circuit section 3 operates a voltage conversion before the power factor control section 2 stabilizes the power factor of the output voltage. This drawback makes the output voltage of the power factor control section 2 very unstable.

SUMMARY OF THE INVENTION

The object of the present invention is to provide an output voltage stabilizing circuit of a power factor correction circuit which can improve functions of an electric appliance by initially stabilizing an output voltage of the power factor correction circuit such as used in a TV or monitor employing an error amplifier by controlling an on-off timing of a reference oscillating waveform which varies in response to an error voltage in accordance with a charge/discharge voltage outputted from a soft start circuit section.

To achieve the above object, the present invention provides an output voltage stabilizing circuit of a power factor correction circuit having a power factor correction circuit section for controlling a power factor of a power supply voltage rectified by a rectifying section, comprising:

a flyback transformer (FBT) for converting the rectified voltage inputted from a power factor correction circuit section to apply a high voltage and output a sync signal;

a first control driving section comprising a DC/DC converter for outputting a switching control signal of the Flyback transformer to stabilize the initial output voltage of the rectified power supply, the power factor of which has been corrected by the power factor correction circuit section;

switching section for controlling the operation of a soft start circuit in accordance with the sync signal of the FBT;

error amplifier for amplifying the output voltage of the power factor correction circuit section which is formed according to the switching operation of the switching section;

comparing section for comparing an output voltage amplified by the error amplifier with the initial output voltage of the power factor correction circuit section, and outputting a voltage as a result of the comparison; and a second control driving section for controlling a duty ratio to stabilize the initial output voltage of the power factor correction circuit section according to the out voltage of the comparing means.

BRIEF DESCRIPTION OF THE DRAWINGS

Other objects, characteristics and advantages of the present invention will become more apparent by describing the preferred embodiment thereof with reference to the attached drawings, in which:

FIG. 5B is a waveform diagram illustrating an output of the flyback transformer sync signal according to the output voltage stabilizing circuit of a power factor correction circuit of the present invention.

DETAILED DESCRIPTION OF THE PREFERRED EMBODIMENT

Figure 1:
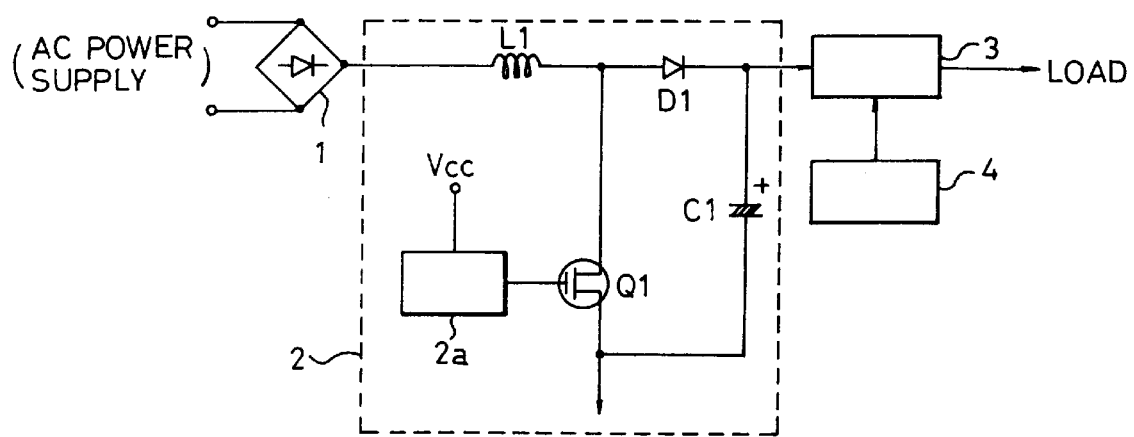
FIG. 1 is a schematic circuit diagram of a power supply circuit of an electric appliance comprising the conventional power factor correction circuit.
Figure 3:
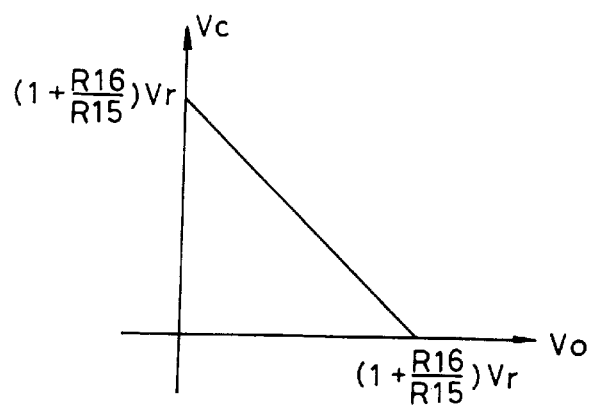
FIG. 3 is a waveform diagram comparatively illustrating input/output voltages of the error amplifier according to the present invention.
Figure 2:
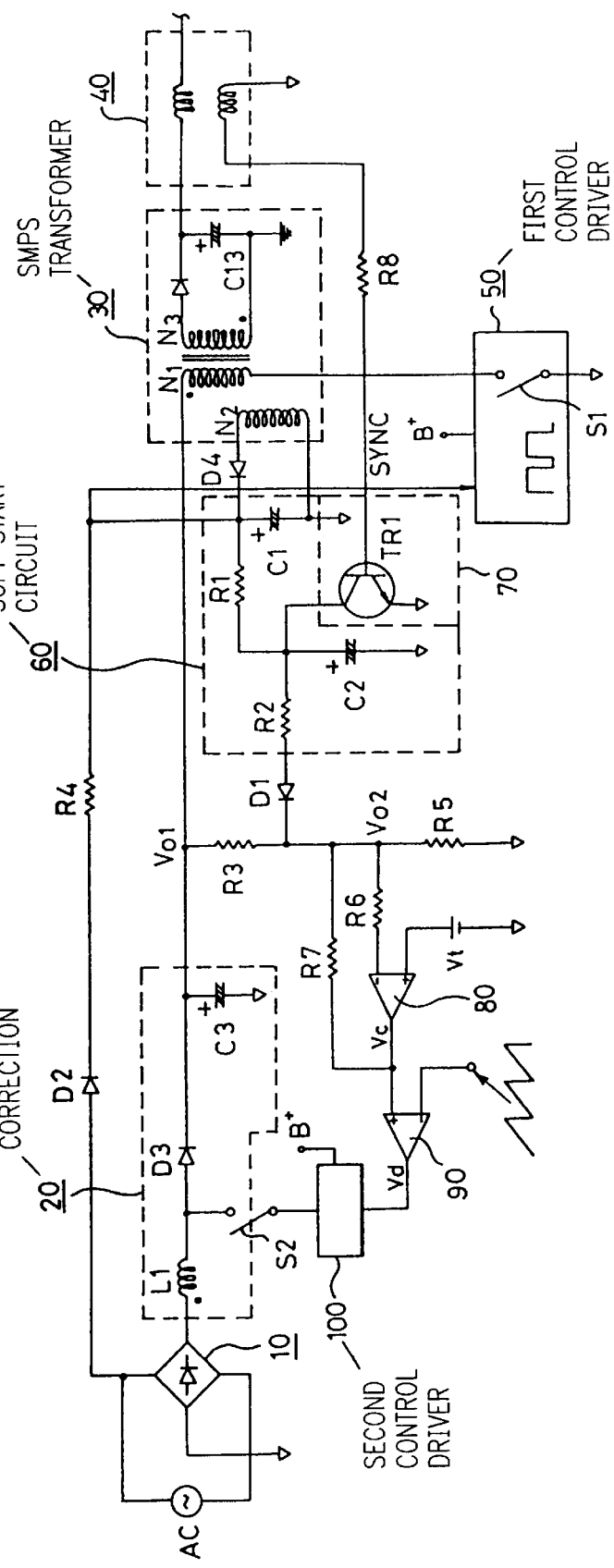
FIG. 2 is a schematic circuit diagram of an output voltage stabilizing circuit of a power factor correction circuit according to the present invention.

FIG. 2 is a schematic circuit diagram illustrating the construction of the output voltage stabilizing circuit of a power factor correction circuit according to the present invention.

Referring to FIG. 2, in order to stabilize the output voltage of the power factor correction circuit, the circuit according to the present invention includes a rectifying section 10 for full-wave-rectifying the input AC power supply; a power factor correction circuit section 20 for controlling a power factor of the power supply voltage rectified by the rectifying section 10; an SMPS transformer 30 for converting the rectified voltage inputted from the power factor correction circuit 20 to supply the converted voltage to the load terminal; a flyback transformer (FBT) 40 for applying a high voltage by means of the voltage inputted to the SMPS transformer 30 and outputting a sync signal SYNC; a first control driving section 50 for outputting a switching control signal of the flyback transformer 40 to stabilize the initial output voltage Vol of the rectified power supply, the power factor of which has been corrected by the power factor correction circuit section 20; a soft start circuit section 60 for charging or discharging according to the input voltage of the SMPS transformer 30; a switching section 70 for controlling the operation of charging or discharging of the soft start circuit section 60 in response to the sync signal of the flyback transformer 40; an error amplifying section So for amplifying the output voltage Vol of the power factor correction circuit section 20 according to the switching operation of the switching section 70; a comparing section 90 for comparing an output voltage vc amplified by the error amplifying section 80 with the reference oscillating waveform, and determining an on-off timing of the oscillating waveform as a result of the comparison; and a second control driving section 100 for controlling a duty ratio of the operation of the power factor correction circuit 20 to stabilize the initial output voltage of the power factor correction circuit section 20 according to an on/off timing signal of the oscillating waveform determined by the comparing section 90.

The soft start circuit section 60 includes a capacitor C1, connected to both ends of a secondary winding of the SMPS transformer 30, for performing a charging or discharging operation; and a capacitor C2 connected to one end of the capacitor C1. The switching section 70 is connected between the capacitor C2 and a resistor R1. One end of the power factor correction circuit section 20 is connected to one end of the capacitor C2 via resistors R2, R3 and a diode D1. The rectifying section 10 is connected to the other end of the capacitor C1 via a diode D2 and a resistor R4.

The power factor correction circuit section 20 includes a coil L1 one end of which is connected to an output terminal of the rectifying section 10 and the other end of which is connected to a primary winding N1 of the SMPS transformer 30 through a diode D3.

The first control driving section 50 is connected to input terminal of the SMPS transformer 30.

Here, a transistor or a field effect transistor (FET) may be used as a switching device in the switching section 70, while an operational amplifier may be used in the error amplifying section 80 and comparing section 90. A resistor R6, which is connected to a contact point of the diode D1 and a resistor R5, is connected to an inverting terminal of the error-amplifying section 80. A reference voltage vt is connected to a non-inverting terminal of the error amplifying section 80. A resistor R7 connected to the diode D1 is connected between the non-inverting terminal of the comparing section 90 and the output terminal of the error amplifier.

The reference numerals D4, TR1, R8, S1 and S2, and N3 denote a diode, a transistor, a resistor for protecting the transistor, switching elements, and a third winding of the SMPS transformer, respectively.

Operation of the stabilizing circuit of a power factor correction circuit according to the present invention having the above construction will now be explained in detail.

If an AC current power supply is inputted to the rectifying section 10, the rectifying section 10 rectifies and inputs the rectified power supply voltage to the power factor correction circuit section 20. The rectified voltage inputted to the power factor correction circuit section 20 is supplied to the primary winding N1 of the SMPS transformer 30 after the power factor is corrected by the coil L1, diode D3, and capacitor C3. The voltage B$^+$rectified through the diode D2 and the resistor R4 is inputted to the first control driving section 50 as its initial driving voltage. Then, the first driving control section 50 is operated to turn on the internal switching terminal S1, thereby operating the SMPS transformer 30. The SMPS transformer 30 then applies the driving voltage to the flyback transformer 40.

At the initial power-on stage before the SMPS transformer 30 operates normally, the flyback transformer 40 cannot operate normally. Therefore, no sync signal is inputted to the base terminal of the transistor TR1 in the switching section 70. As a result, the switching section 70 is not turned on at the initial power-on stage.

If the SMPS transformer 30 is operated, the capacitor C1 is charged by the initial voltage Vol of the power factor correction circuit section 20 via a diode D4 connected to the secondary winding N2 of the SMPS transformer 30.

If the capacitor C1 is charged to a predetermined level, the discharging voltage of the capacitor C1 is inputted to the capacitor C2 via the resistor R1, thereby charging the capacitor C2. The voltage charging the capacitor C2 is then discharged to the resistor R5 via the resistor R2 and diode D1 after a predetermined time elapses. The voltage charging or discharging the capacitor C2 is used as a compared voltage of the error amplifying section 80. Accordingly, the error amplifying section 80 amplifies the charged voltage inputted to the capacitor C2, i.e., the error voltage at the initial operation, to a predetermined level according to the reference voltage Vt, and inputs the error-amplified voltage Vc to the comparing section 90. Then, the comparing section 90 compares the error-amplified voltage of the error amplifying section 80 with the reference oscillating waveform. For instance, if the error-amplified voltage is higher, the comparing section 90 outputs the reference oscillating waveform in reduced on-timing. Then, the second control driving section 100 reduces the duty ratio according to the reference oscillating waveform with reduced on-timing. In other words, the switching element S2 is turned on during the on-timing of the reference oscillating waveform. Accordingly, the voltage Vol-2 charges the capacitor C3 of the power factor correction circuit section 20, and thereby the SMPS transformer 30 operates smoothly at an initial power-on stage.

The output voltage Vo1 of the power factor correction circuit section 20 can be expressed by the following equation:

$$Vol = \frac{1}{1-D} Vol\text{-}1 \qquad \text{Equation 1}$$

where, D denotes a duty, and Vol-1 is a terminal voltage of the capacitor C3 before the second control driving section 100 operates.

The output voltage Vc of the comparing section 80 by means of a predetermined power supply under the equation 1 varies according to an increase of the output voltage Vol of the power factor correction circuit section 20 as expressed by the following equation.

$$Vc = \frac{R7}{R6} Vol + \left(1 - \frac{R6}{R7}\right) Vt \qquad \text{Equation 2}$$

Figure 4A:
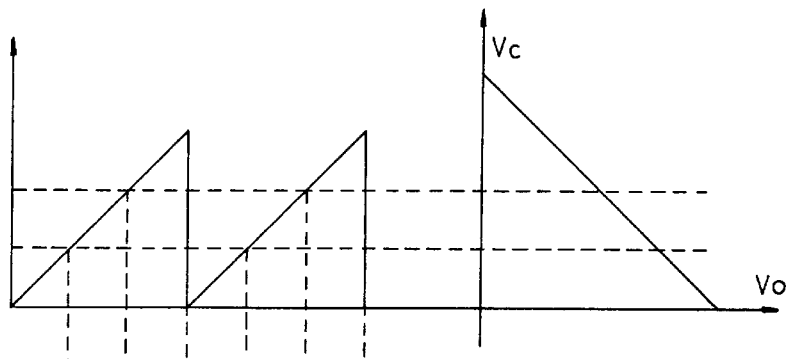
FIGS. 4A and 4B are waveform diagrams comparatively illustrating input/output voltages of the comparator according to the present invention.
Figure 4B:
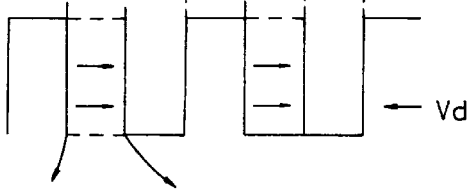
Figure 5A:
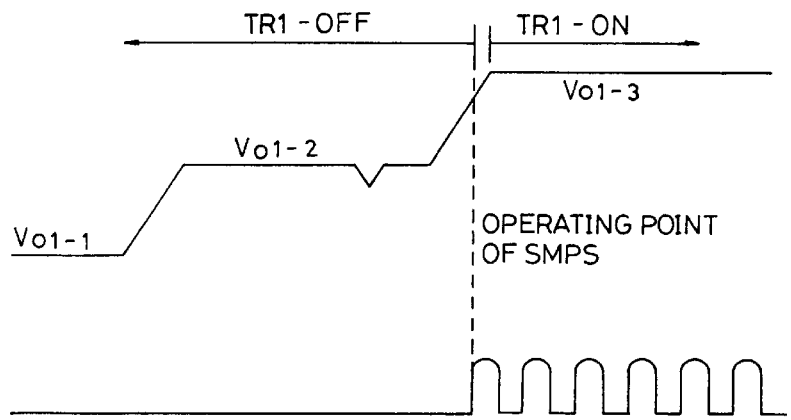
FIG. 5A is a waveform diagram illustrating an output voltage Vol of the power factor correction circuit section 20 according to the present invention.

On-timing, i.e., duty is reduced as illustrated in FIGS. 4A and 4B, and the initial output voltage Vol-2 of the power factor correction circuit section 20 becomes lowered. If the flyback transformer 40 operates normally after the elapse of a predetermined time, a high voltage is applied to the flyback transformer 40, and a sync-signal is simultaneously inputted to the base terminal of the transistor TR1 in the switching section 70 as illustrated in FIG. 5a. The transistor TR1 is turned on as illustrated in FIG. 5A, and the charged voltage of the capacitor C2 flows through the transistor TR1. As a result, the voltage across the resistor R5 connected to the inverting terminal of the error amplifying section 80 via the resistor R6 is lowered, thereby increasing the on-timing of the reference oscillating waveform of the comparing section 90. According to the increased on-timing of the reference oscillating waveform of the comparing section 80, the duty ratio of the second control driving section 100 increases, thereby stabilizing the output voltage of the power factor correction circuit section 20 to be in a normal state. That is, the waveform of FIG. 5A becomes a normal output voltage Vol-3.

As described above, the present invention serves to enhance conservation function of an electric appliance by initially stabilizing an output voltage of the power factor correction circuit of a TV or monitor employing an error-amplifier through control of an on/off timing of a reference oscillating waveform which varies in response to an error-voltage in accordance with a charge/discharge voltage from the soft start circuit section, i.e., by soft-starting and stabilizing the output voltage of the power factor correction circuit.

What is claimed is:

1. An output voltage stabilizing circuit having a power factor correction circuit for correcting a power factor of a power supply voltage rectified by a rectifier and a switching mode power supply (SMPS) transformer for converting the rectified voltage inputted from the power factor correction circuit to supply the converted voltage to a load terminal, comprising:

a flyback transformer (FBT) for generating a high voltage from a voltage inputted from the SMPS transformer, and outputting a sync signal;

a first control driving section for providing a switching control signal to the SMPS transformer to stabilize the initial output voltage of the rectified power supply, the power factor of which has been corrected by the power factor correction circuit;

a soft start circuit for performing a charging or discharging operation according to a first output of the SMPS transformer;

a switching section for controlling the charging or discharging operation of the soft start circuit in response to the sync signal of the FBT;

an error amplifier for amplifying the output voltage of the power factor correction circuit according to the switching operation of the switching section;

a comparing section for comparing an output voltage amplified by the error amplifier with the reference oscillating waveform, and determining an on/off timing of the oscillating waveform; and a second control driving section for stabilizing the initial output voltage of the power factor correction circuit by controlling a duty ratio of the output voltage according to the on/off timing signal of the oscillating waveform determined by the comparing section.

2. An output voltage stabilizing circuit of claim 1, wherein the soft start circuit comprises:

a first capacitor, connected to both ends of a secondary winding of the SMPS transformer, for performing a charging or discharging operation; and a second capacitor connected to one end of the first capacitor through a resistor;

wherein the switching section is connected to the second capacitor.

3. An output voltage stabilizing circuit of claim 1, wherein the switching section comprises a transistor or a field effect transistor.

4. An output voltage stabilizing circuit of claim 1, wherein the error amplifier comprises an operational amplifier.

5. An output voltage stabilizing circuit of claim 1, wherein the comparing section comprises an operational amplifier.

6. An output voltage stabilizing circuit of a power factor correction circuit for correcting a power factor of a power supply voltage rectified by a rectifier, comprising:

a switching mode power supply (SMPS) arranged to receive an output of the power factor correction circuit and to produce an SMPS output that is connected to a flyback transformer (FBT) operable to output a sync signal;

a driver section connected to the SMPS and operable to provide thereto a switching control signal;

a soft start circuit connected to an output of the SMPS and operable to perform a charge and discharge operation;

a switching section having an output connected to the soft start circuit and operable to control the charging or discharging operation of the soft start circuit in response to the sync signal of the FBT;

a comparing section connected to the soft start circuit and operable to compare the output voltage of the soft start circuit with a reference waveform; and a control driving section connected to the comparing section and operable to stabilize the initial output voltage of the power factor correction circuit by controlling a duty ratio of the output voltage according to the output voltage of the comparing section.

7. An output voltage stabilizing circuit of claim 6, further comprising an error amplifying section connected between the comparing section and the soft start circuit, and operable to amplify the output voltage of the power factor correction circuit.

8. An output voltage stabilizing circuit of claim 6, wherein the soft start circuit comprises:

a first capacitor connected to both ends of a secondary winding of the SMPS and operable to perform a charging or discharging operation; and a second capacitor connected to one end of the first capacitor through a resistor; wherein the switching section is connected to the second capacitor and a control input of the switching section receives the sync signal.

* * * * *